(12) United States Patent
Joung et al.

(10) Patent No.: US 7,835,336 B2
(45) Date of Patent: Nov. 16, 2010

(54) METHOD OF COLLECTING DATA USING MOBILE IDENTIFICATION NUMBER IN WCDMA NETWORK

(75) Inventors: Jinsoup Joung, Seongnam (KR); Yeonsong Kim, Seoul (KR); Junghoon Lee, Seoul (KR)

(73) Assignee: Innowireless, Co., Ltd., Seongnam (KR)

( * ) Notice: Subject to any disclaimer, the term of this patent is extended or adjusted under 35 U.S.C. 154(b) by 730 days.

(21) Appl. No.: 11/832,125

(22) Filed: Aug. 1, 2007

(65) Prior Publication Data

US 2008/0031215 A1 Feb. 7, 2008

(30) Foreign Application Priority Data

Aug. 1, 2006 (KR) .............. 10-2006-0072742

(51) Int. Cl.
*H04B 7/216* (2006.01)
*H04L 12/26* (2006.01)
*H04L 12/66* (2006.01)

(52) U.S. Cl. ............... 370/342; 370/252; 370/310.1; 370/352; 370/401; 455/435.1; 709/224

(58) Field of Classification Search ........... 370/310, 370/310.1, 342, 352, 389, 401, 252; 709/224; 455/435.1

See application file for complete search history.

(56) References Cited

U.S. PATENT DOCUMENTS

| | | | | |
|---|---|---|---|---|
| 6,754,834 B2* | 6/2004 | Miettinen et al. | ............ | 726/3 |
| 7,310,331 B2* | 12/2007 | Sjoblom | ............ | 370/353 |
| 7,369,848 B2* | 5/2008 | Jiang | ............ | 455/432.3 |
| 7,505,769 B2* | 3/2009 | Jiang | ............ | 455/432.3 |
| 7,577,431 B2* | 8/2009 | Jiang | ............ | 455/432.1 |
| 7,602,753 B2* | 10/2009 | Kim | ............ | 370/338 |
| 7,620,389 B2* | 11/2009 | Kallio et al. | ............ | 455/414.1 |
| 2004/0095894 A1* | 5/2004 | Eloranta et al. | ............ | 370/252 |
| 2004/0157629 A1* | 8/2004 | Kallio et al. | ............ | 455/466 |
| 2006/0034198 A1* | 2/2006 | Makinen et al. | ............ | 370/310 |
| 2006/0276226 A1* | 12/2006 | Jiang | ............ | 455/558 |
| 2007/0047523 A1* | 3/2007 | Jiang | ............ | 370/352 |
| 2010/0034089 A1* | 2/2010 | Kovvali et al. | ............ | 370/235 |

* cited by examiner

*Primary Examiner*—Chi H Pham
*Assistant Examiner*—Ahmed Elallam
(74) *Attorney, Agent, or Firm*—Rothwell, Figg, Ernst & Manbeck, P.C.

(57) ABSTRACT

Disclosed herein is a method of collecting data using a Mobile Identification Number (MIN) in a Wideband Code Division Multiple Access (WCDMA) network. The method includes the steps of (a) reassembling ATM/AAL5 data into SCCP and higher layer data in an Iu-PS interface link, and capturing the reassembled data; (b) extracting SLR or DLR data from Connection Request (CR) or Connection Confirm (CC) of the captured SCCP data, and storing reference Radio Access Network Application Part (RANAP) message data having the higher layer data in storage based on the extracted SLR or DLR data; (c) extracting a mobile IP address related to the MIN of the mobile station in the Gn interface link; and (d) registering SLR or DLR data having the mobile IP address, and, afterward, capturing and extracting transmitted and received data having the SLR or DLR data in the Iu-PS interface link.

5 Claims, 7 Drawing Sheets

[Fig. 1]
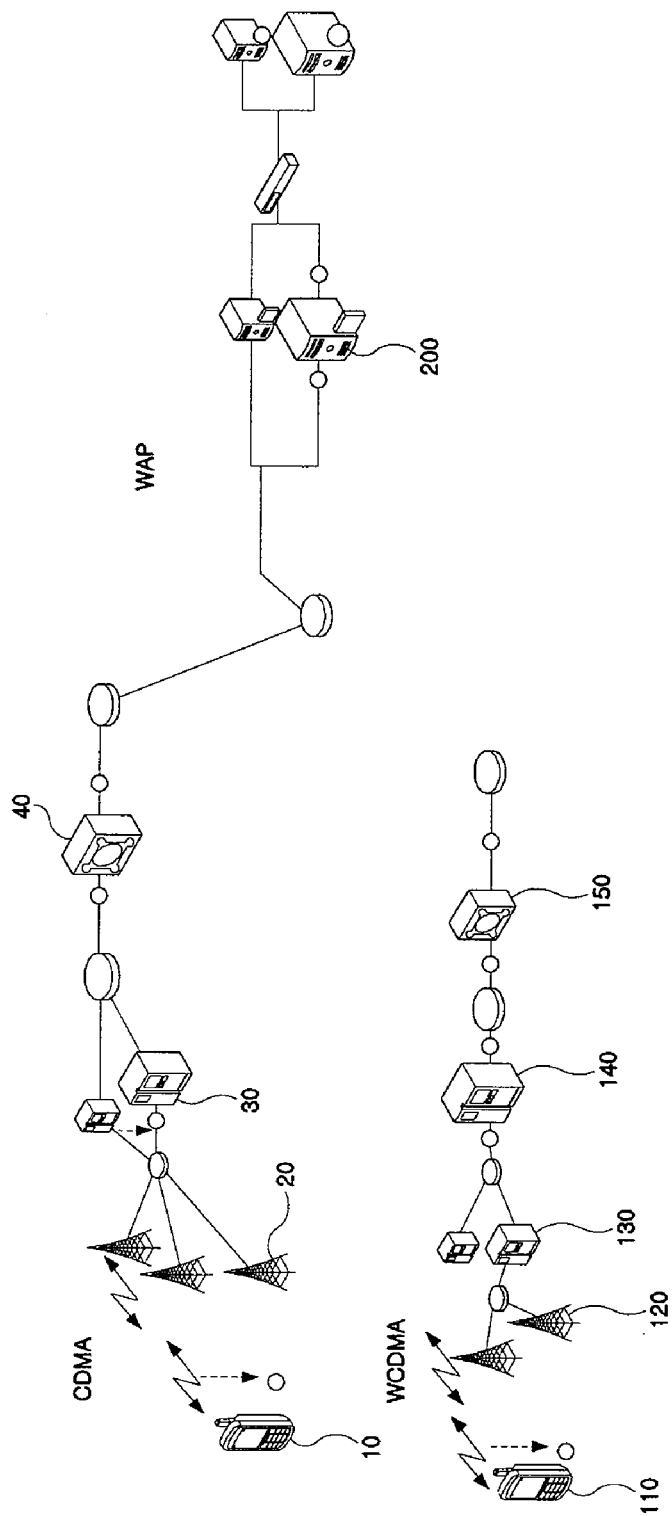

[Fig. 2]

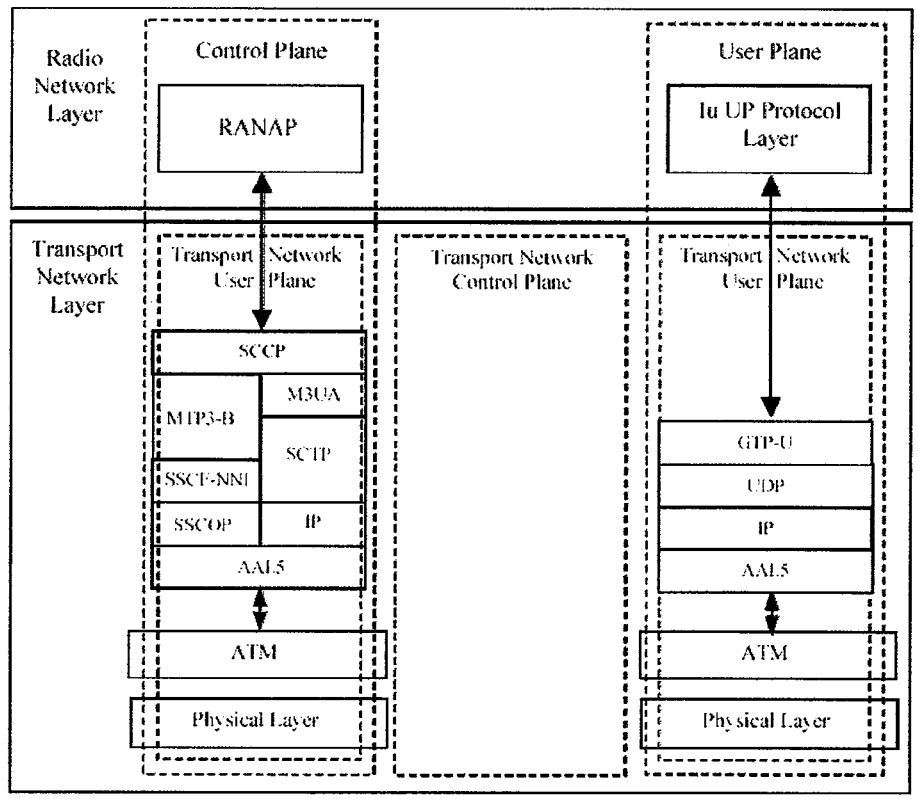

[Fig. 3]

```
Signalling Connection Control Part
  Message Type: Connection Refused (0x03)
  Destination Local Reference: 0x000324
  Refusal Cause: SCCP user originated (0x03)
  Pointer to optional parameter: 1
- Called Party address (4 bytes)
  - Address Indicator
      .1.. .... = Routing Indicator: Route on SSN (0x01)
      ..00 00.. = Global Title Indicator: No Global Title (0x00)
      .... ..1. = SubSystem Number Indicator: SSN present (0x01)
      .... ...1 = Point Code Indicator: Point Code present (0x01)
    ..10 0110 0000 0011 = PC: 9731
    SubSystem Number: RANAP (142)
    [Linked to RANAP]
  End of optional
```

[Fig. 4]
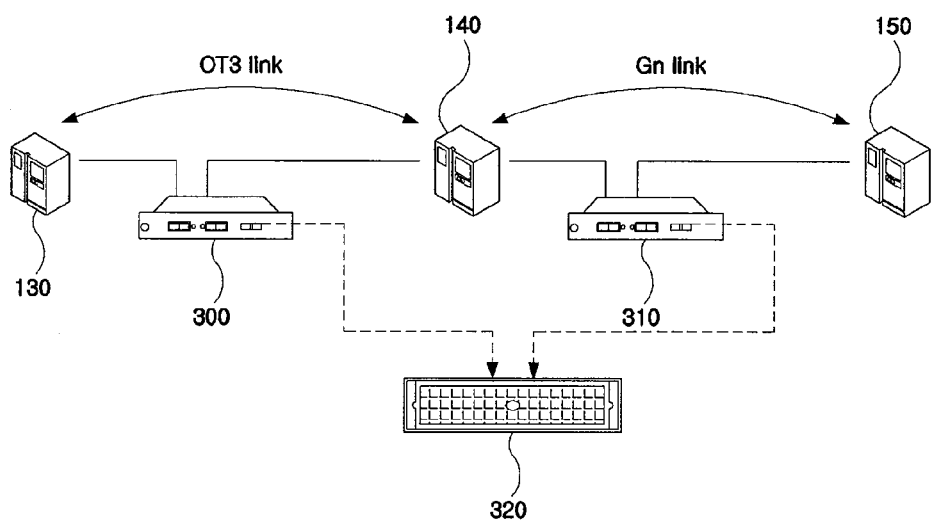

[Fig. 5]
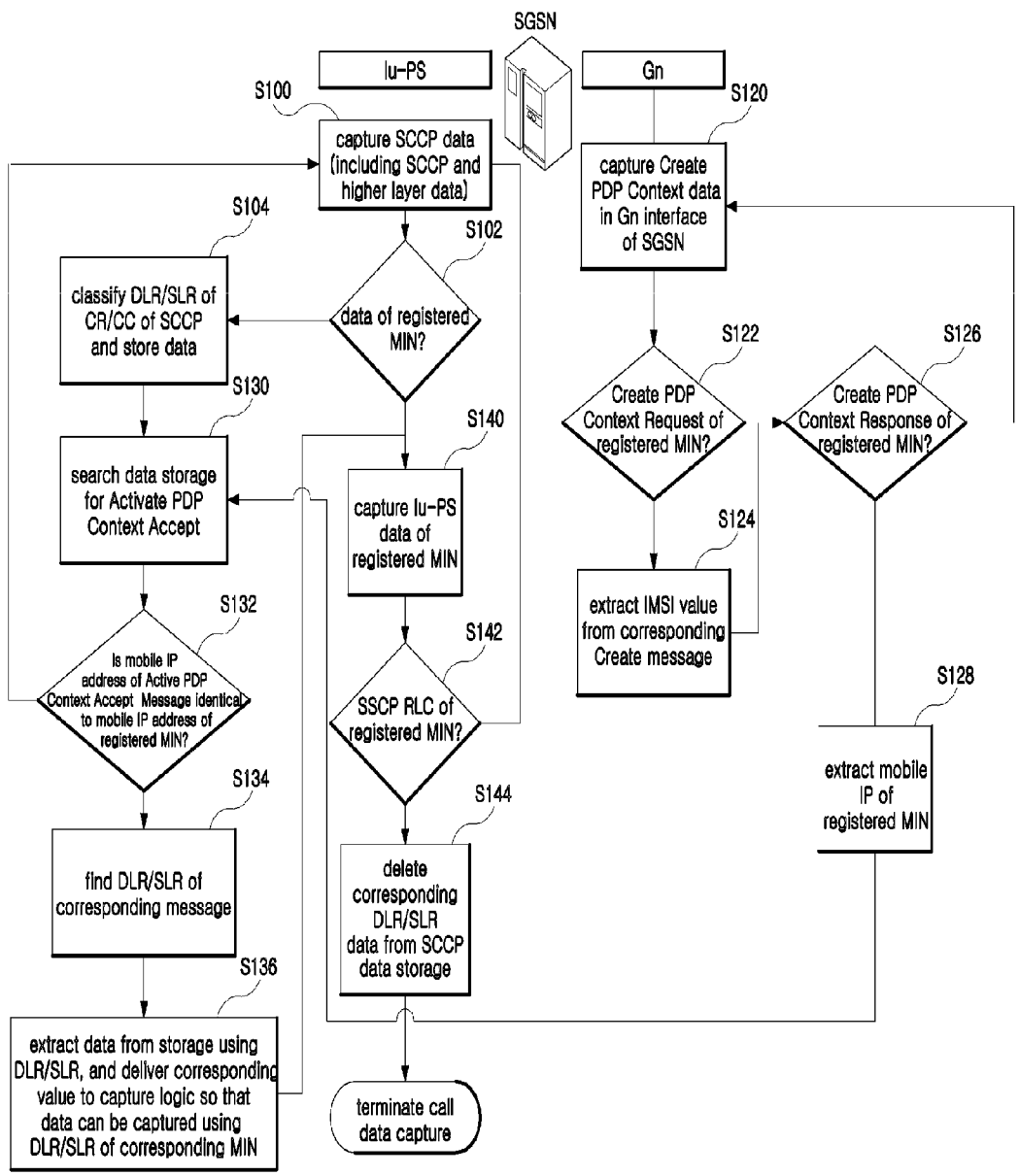

[Fig. 6]
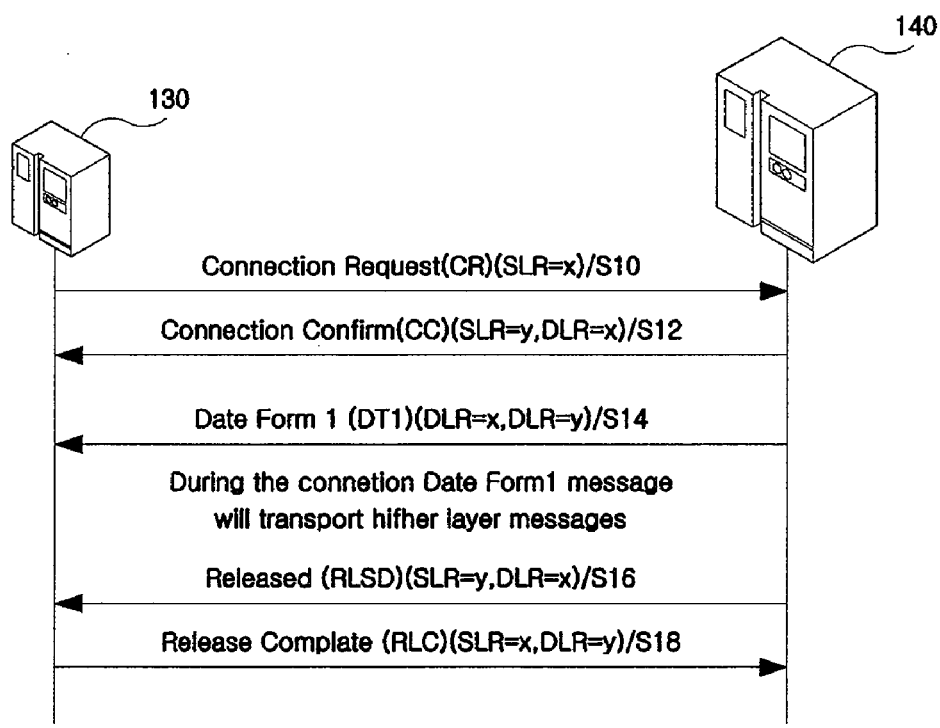

[Fig. 7a]

```
+ Frame 38458 (164 bytes on wire, 164 bytes captured)
+ InroWireless PCS, Length: 164, Node: TESTING CODE SSCOP (0xFFFE), MIN:
+ SSCOP
  SSCF-NNI
+ Message Transfer Part Level 3
- Signalling connection control part
    Message Type: Connection Request (0x01)
    Source Local Reference: 0x0002a4
    .... 0010 - Class: 0x02
    Pointer to first mandatory variable parameter: 2
    Pointer to Optional parameter: 0
    + Called Party address (6 bytes)
    + Calling Party address (4 bytes)
    End of Optional
+ Radio Access Network Application Part
- GSM A-I/F DTAP - Attach Request
    + Protocol Discriminator: GPRS mobility management messages
        0000 .... = Skip Indicator: 0
        .... 1000 = Protocol discriminator: GPRS mobility management messages (8)
    Message Type Attach Request
    + MS Network Capability
    - Attach Type
        Type: (3) combined GPRS/IMSI attach
        Follow: (0) No follow-on request pending
    Ciphering Key Sequence Number: 0x07 (7)
    - DRX Parameter
        Split PG Cycle Code: (10) 10
        0000 .... = CN Specific DRX cycle length coefficient: CN Specific DRX cycle length coefficient not specified by the MS (0)
        .... 0... = SPLIT on CCCH: split pg cycle on CCCH is not supported by the mobile station
        .... .000 = Non-DRX timer: no non-DRX mode after transfer state (0)
    - Mobile Identity - IMSI (450050209500261)
        Length: 8
        0100 .... : Identity Digit 1: 4
        .... 1... = Odd/even indication: Odd number of identity digits (1)
        .... .001 = Mobile Identity Type: IMSI (1)
        BCD Digits: 450050209500261
    Routing area identification: fff-ff-fffe-ff
    - MS Radio Access Capability
        Length: 11
        + MS RA Capability 1
        + MS RA capability 2
    + GPRS Timer - Ready Timer
    - TMSI Status
        1001 .... : Element ID
        TMSI Status: (0) no valid TMSI available
    Extraneous Data
```

[Fig. 7b]

| No. | Time | Source | Destination | Protocol | Info. |
|---|---|---|---|---|---|
| 33269 | 409.01031 | 9731 | 16131 | RANAP | id-Paging |

```
+ Routing label
- Signalling Connection Control Part
    Message Type: Unitdata (0x09)
    .... 0000 = Class: 0x00
    1000 .... = Message handling: Return message on error (0x08)
    Pointer to first Mandatory Variable parameter: 3
    Pointer to second Mandatory Variable parameter: 7
    Pointer to third Mandatory Variable parameter: 11
  - Called Party address (4 bytes)
    - Address Indicator
        .1.. .... = Routing Indicator: Route on SSN (0x01)
        ..00 00.. = Global Title Indicator: No Global Title (0x00)
        .... ..1. = SubSystem Number Indicator: SSN present (0x01)
        .... ...1 = Point Code Indicator: Point Code present (0x01)
        ..11 1111 0000 0011 = PC: 16131
    SubSystem Number: RANAP (142)
    [Linked to RANAP]
  - Calling Party address (4 bytes)
    - Address Indicator
        .1.. .... = Routing Indicator: Route on SSN (0x01)
        ..00 00.. = Global Title Indicator: No Global Title (0x00)
        .... ..1. = SubSystem Number Indicator: SSN present (0x01)
        .... ...1 = Point Code Indicator: Point Code present (0x01)
        ..10 0110 0000 0011 = PC: 9731
    SubSystem Number: RANAP (142)
    [Linked to RANAP]
- Radio Access Network Application Part
  - RANAP_PDU: initiatingMessage (0)
    - initiatingMessage
        procedureCode: id-Paging (14)
        criticality: ignore (1)
      - paging
        - protocolIEs: 5 items
          - Item 0
            - Item
                id: id-CN-DomainIndicator (3)
                criticality: ignore (1)
                id-CN-DomainIndicator: ps-domain (1)
          - Item 1
            - Item
                id: id-PermanentNAS-UE-ID (23)
                criticality: ignore (1)
              - id-PermanentNAS-UE-ID: iMSI (0)
                  iMSI: 54000502608176F0
          - Item 2
            - Item
                id: id-TemporaryUE-ID (64)
                criticality: ignore (1)
              - id-TemporaryUE-ID: p-TMSI (1)
                  p-TMSI: D883D7C6
          - Item 3
            - Item
                id: id-PagingAreaID (21)
                criticality: ignore (1)
              - id-PagingAreaID: rAI (1)
                + rAI
          - Item 4
            - Item
                id: id-PagingCause (22)
                criticality: ignore (1)
                id-PagingCause: terminating-low-priority-signalling (4)
```

METHOD OF COLLECTING DATA USING MOBILE IDENTIFICATION NUMBER IN WCDMA NETWORK

RELATED APPLICATIONS

The present disclosure relates to subject matter contained in priority Korean Application No. 10-2006-0072742, filed on 1 Aug. 2006 which is herein expressly incorporated by reference in its entirety.

BACKGROUND OF THE INVENTION

1. Field of the Invention

The present invention relates generally to a method of collecting data using a Mobile Identification Number (MIN) in a Wideband Code Division Multiple Access (WCDMA) network, and more particularly to a method of collecting data using a MIN in a WCDMA network, which is capable of collecting transmitted and received data using a MIN in the Iu-Packet Switched (PS) link of a Serving GPRS (General Packet Radio Service) Support Node (SGSN) system in a WCDMA network.

2. Description of the Related Art

As is well known to those skilled in the art, mobile communication has succeeded in increasing the capability thereof while evolving from the first analog generation to the second digital generation, but has disadvantages in that only voice-oriented service is supported and in that there is difficulty with global roaming due to the adoption of different standards in respective regions. As part of efforts to overcome the limitations of the regional and voice-oriented service of the second generation mobile communication, International Mobile Telecommunications-2000 (IMT-2000) has been developed as a third generation mobile communication system. The requirements of IMT-2000 state that service capable of integrating voice with data can be provided and that the data transmission rate must be high, that is, higher than 2 MBPS.

Meanwhile, groups directly responsible for practical work in the establishment of the IMT-2000 standard include the 3rd Generation Partnership Project (3GPP), based in Europe and Japan, and the 3rd Generation Partnership Project 2 (3GPP2), based in North America. The standard being established by 3GPP is WCDMA, known as asynchronous Code Division Multiple Access (CDMA), and the standard being established by 3GPP2 is CDMA2000, known as synchronous CDMA.

Meanwhile, in the case of searching for transmitted and received data in the Iu-PS link of a specific mobile station in order to measure the quality of service currently provided by a WCDMA network system, an International Mobile Station Identity (IMSI), which is the international mobile station identification number of a corresponding mobile station, and a Packet-Temporary Mobile Subscriber Identity (P-TMSI), which is a packet-temporary mobile subscriber identification number, have been directly used. Here, an IMSI is a unique 15-digit number assigned to a mobile station at the time of subscription to a Global System for Mobile Communications (GSM) service. An IMSI contains a mobile country code, a mobile network code, a mobile subscriber identification number, and a national mobile subscriber identity. A TMSI is a temporary identification number used to identify a mobile station in a mobile communication system. A TMSI is assigned by the Authentication Center (AC) of a Home Location Register (HLR), and is used instead of an IMSI between a mobile station and a Mobile Switching Center (MSC) for security reasons.

However, since a P-TMSI is a frequently changing value and, thus, complicated dedicated analysis monitoring equipment must be used, or a specific network manager must intervene in order to directly find out P-TMSI, there is great difficulty in searching for transmitted and received data in an Iu-PS link.

SUMMARY OF THE INVENTION

Accordingly, the present invention has been made keeping in mind the above problems occurring in the prior art, and an object of the present invention is to provide a method of collecting data using a MIN in a WCDMA network, which is capable of collecting transmitted and received data using a MIN in the Iu-PS link of an SGSN system in a WCDMA network with the aid of general-purpose equipment.

In order to accomplish the above object, the present invention provides a method of collecting data using a MIN in a WCDMA network, in which transmitted and received data related to a mobile station is collected in an Iu-PS interface link in the WCDMA network, in which an SGSN and an RNC are connected to each other via the Iu-PS interface link and the SGSN and a GGSN are connected to each other via an Gn interface link, the method including the steps of (a) reassembling ATM/AAL5 data into SCCP and higher layer data in the Iu-PS interface link, and capturing the reassembled data; (b) extracting SLR or DLR data from Connection Request (CR) or Connection Confirm (CC) of the captured SCCP data, and storing reference Radio Access Network Application Part (RANAP) message data having the higher layer data in storage based on the extracted SLR or DLR data; (c) extracting a mobile IP address related to the MIN of the mobile station in the Gn interface link; and (d) registering SLR or DLR data having the mobile IP address, and, afterward, capturing and extracting transmitted and received data having the SLR or DLR data in the Iu-PS interface link.

Step (c) may include the steps of (c1) capturing a Create PDP Context Request message in the Gn interface link; (c2) if MSISDN included in the captured Create PDP Context Request message is a MIN to be acquired, extracting an IMSI from the Create PDP Context Request message; and (c3) if a Create PDP Context Response message, that is, a response to the Create PDP Context Request message, has been received, searching the received Create PDP Context Response message for the mobile IP address assigned to the mobile station.

Preferably, the registration of the SLR or DLR data at step (d) may include the steps of (d1) searching the SLR or DLR-based data, stored at step (b), for an Activate PDP Context Accept message using the mobile IP address found at step (c3); (d2) determining whether a mobile IP address of the mobile station contained in the found Activate PDP Context Accept message is identical to the mobile IP address of the MIN found at step (c3); and (d3) if the two mobile IP addresses are identical to each other, searching the Activate PDP Context Accept message for SLR or DLR data of the SCCP data and registering the SLR or DLR data.

Preferably, the method may further include the steps of extracting the data, stored at step (b), using the SLR or DLR data registered at the step (d); searching the data, extracted at the previous step, for a Service Request or a CR-Attach Request, extracting a P-TMSI or an IMSI from the message, and storing the P-TMSI or IMSI in association with the SLR or DLR data; and extracting data having the stored P-TMSI or IMSI from the transmitted and received data, captured at step (d), in the Iu-PS interface link. The data using the P-TMSI or IMSI may be the Id-Paging packet of the RANAP message data.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic network configuration diagram for a mobile communication system, including CDMA and WCDMA;

FIG. 2 is a diagram showing the protocol stack of a typical Iu-PS interface;

FIG. 3 is a diagram illustrating the details of a Connection Refuse message type;

FIG. 4 is a configuration diagram showing an apparatus for collecting data using a MIN in a WCDMA network according to the present invention;

FIG. 5 is a flowchart illustrating a method of collecting data using a MIN in a WCDMA network according to the present invention;

FIG. 6 is a call flow diagram illustrating a call start and end procedure that is performed between an RNC and an SGSN in a WCDMA network; and FIG. 7A shows a message type illustrating the fact that, in the case where no P-TMSI exists in a CR-Attach Request, transmitted and received data can be extracted in an Iu-PS link, and FIG. 7B shows a message type illustrating the fact that a packet, which is not captured using the SLR/DLR data of the SCCP, can be captured using an IMSI or a P-TMSI included in the Id-Paging of an RANAP.

DESCRIPTION OF THE PREFERRED EMBODIMENTS

A method of collecting data using a MIN in a WCDMA network according to a preferred embodiment of the present invention will be described in detail with reference to the accompanying drawings.

FIG. 1 is a schematic network configuration diagram for a mobile communication system including CDMA and WCDMA. As shown in FIG. 1, the network configuration of the mobile communication system including CDMA and WCDMA may be divided into a CDMA part and a WCDMA part. First, the CDMA part may include a plurality of mobile stations 10, a plurality of Base Transceiver Stations (BTSs) 20, a plurality of Base Station Controller/Packet Control Functions (BSC/PCFs) 30, and a Packet Data Serving Node (PDSN) 40, and a WCDMA part may include a plurality of mobile stations 110, a plurality of nodes B 120, a plurality of Radio Network Controllers (RNCs) 130, an SGSN 140, and a Gateway GPRS Support Node (GGSN) 150.

In the above-described construction, the mobile station 10 may be implemented using a mobile phone, or a Personal Digital Assistant (PDA) or a laptop computer equipped with a mobile communication function, which can be carried by a user and used while moving. The BTS 20 is responsible for a radio antenna function for the transmission and reception of radio data between the mobile station 10 and the BSC/PCF 30. The BSC/PCF 30 transmits data, received from the BTS 20, to the PDSN 40, that is, a higher node, thereby adjusting the connection between respective BTSs 20. The PDSN 40 acts as a gateway that integrally manages the work of supporting a connection between the mobile stations and the wireless Internet, without the intervention of an exchange, such as assigning Internet Protocol (IP) addresses to the mobile stations 10.

In the WCDMA part, the nodes B 120 perform functions of radio signal transmission and reception, radio channel encoding and decoding, signal intensity and quality measurement, baseband signal processing, diversity processing, radio resource management, and self maintenance and repair with respect to the mobile stations (also referred to as "User Equipment (UE)") 110. The RNCs 130 perform functions of interfacing with the nodes B 120, intercell handover processing and call control. Each of the RNCs 130 controls a plurality of nodes B 120. The SGSN 140 is a serving node for GPRS that provides packet service to the mobile stations 110. The SGSN 140 is responsible for the management of packet mode data service for the mobile stations by setting up a mobility management context for the packet mode of the mobile stations 110. Furthermore, the SGSN 140 sets up a Packet Data Protocol (PDP) context with respect to the GGSN 150, and also performs terminal authentication processing. The GGSN 150 is a GPRS gateway node that is directly connected to an external packet data network. The GGSN 150 performs functions of tunneling and IP routing by connecting with the SGSN 140 via an IP-based GPRS backbone network and managing information about routing to the SGSN 140. The GGSN 150 assigns IP addresses to the mobile stations 110 and manages IP addresses in order to provide a service of connection to an IMT-2000 Internet Service Provider (ISP) or other ISPs, and is responsible for functions of Point-to-Point (PPP) Protocol creation, termination and relay, and screening. Meanwhile, the above-described CDMA part and WCDMA part are connected via a router to a Wireless Application Protocol (WAP) gateway 200, which is a node for connecting a wireless network with the Internet, and serves as a gateway for accessing wireless Internet service.

In the above-described construction, Iu-PS is an interface between the RNCs 130 and the SGSN 140, and is generally implemented using OC3 Optical Carrier 3, and Gn is an interface between two GPRS Support Nodes (GSNs), for example, the SGSN 140 and the GGSN 150.

FIG. 2 is a diagram showing the protocol stack of a typical Iu-PS interface. The keys to abbreviations used in FIG. 2 are listed as follows:

ATM: Asynchronous Transfer Mode
AAL5: ATM Adaptation Layer Type 5
SSCOP: Service-Specific Connection Oriented Protocol
SSCF-NNI: Service-Specific Co-ordination Function-Network Node Interface
MTP3 B: Message Transfer Part 3
SCCP: Signaling Connection Control Part
RANAP: Radio Access Network Application Part
GTP: GPRS Tunneling Protocol
M3UA: MTP 3 User Adaptation
GTP C: GTP Control
GTP U: GTP User
IP: Internet Protocol
UDP: User Data Protocol Meanwhile, the layer-based message types of the protocol are described as follows:

First, SCCP message types include Connection Request, Connection Confirm, Data Form1, Inactivity Timer, Release Complete, Released, Unitdata, and Connection Refuse. FIG. 3 is a diagram illustrating the details of a Connection Refuse message type. RANAP Procedure Code includes Id-Initial UE Message, Id-Common ID, Id-security Mode Control, Id-Direct Transfer, Id-Iu-Release, Id-Paging, and Id-RAB-Assignment.

GPRS Mobility Management (GMM) message types include Attach Request, Attach Accept, Attach Complete, Detach Request, GMM Information, Identity-Response, Service Request, Routing Area Update Accept, Activate PDP Context Request, Activate PDP Context Accept, and Authentication and ciphering Request.

GPRS Session Management (GSM) message types include Deactivate PDP Context Request and Deactivate PDP Context Accept, and a Mobility Management (MM) message type includes MM Information. Finally, SMS message types include CP-ACK, RP-ACK (Network to MS), and RP-Data M to Network.

FIG. 4 is a configuration diagram showing an apparatus for collecting data using a MIN in a WCDMA network according to the present invention. As shown in FIG. 4, the apparatus of collecting data using a MIN in a WCDMA network according to the present invention can include two pieces of tap equipment 300 and 310 respectively disposed in a tap Iu-PS OC3 link between the RNCs 130 and the SGSN 140 and a Gn link between the SGSN 140 and the GGSN 150 and configured to extract data passing therethrough, and SGSN data extraction equipment 320 configured to extract SGSN data by analyzing the data extracted from the tapping equipment 300 and 310. In the above-described construction, OC3 tapping equipment may be used as the tapping equipment 300 for the link between the RNCs 130 and the SGSN 140, and gigabit tapping equipment may be used as the tapping equipment 310 between the SGSN 140 and the GGSN 150. Meanwhile, the SGSN data extraction equipment 320 may include a general-purpose network interface card capable of communicating with respective pieces of tapping equipment 300 and 310, and a microprocessor capable of analyzing data. The method of collecting data according to the present invention may be performed using general-purpose equipment.

FIG. 5 is a flowchart illustrating the method of collecting data using a MIN in a WCDMA network according to the present invention. Unless otherwise specified, the microprocessor of the SGSN data extraction equipment 320 performs the method as a subject. As shown in FIG. 5, at step S100, ATM/AAL5 data is reassembled into SCCP and higher layer (GMM/SM/MM) data in an Iu-PS link, and then the resulting data is captured. The data obtained through the reassembly are listed as follows:

Attach Request, Attach Accept, Attach Response
Service Request, Service Response
Activate PDP Context Request, Activate PDP Context Response
Deactivate PDP Context Request, Deactivate PDP Context Response
Routing Area Update Complete, Routing Area Update Accept
GMM Information, MM Information
Id-RAB Assignment
Id-security Mode Control
Iu-Release
SCCP Released RSLD, SCCP Release Complete RLC
SCCP Connection Request CR, SCCP Connection Confirm CC
SCCP Inactivity Timer Thereafter, at step S102, whether the captured data is data related to a MIN (MIN), that is, the Source Local Reference (SLR)/Destination Local Reference (DLR) data of an SCCP, previously registered with respect to a mobile station that desires to collect Iu-PS transmitted and received data, is determined. If, as a result of the determination at step S102, the SLR/DLR data of a target MIN (MIN) is determined not to have been registered, the process proceeds to step S104 in order to find out the SLR/DLR data, captures the Connection Confirm (CC) of the SCCP in the Iu-PS node, extracts the SLR/DLR data from the CC, and stores a RANAP message having higher layer data in the storage based on the extracted SLR/DLR data. In this case, of RANAP messages, an Id-Paging message has no SLR/DLR data, and thus the data is separately stored based on an IMSI value or a P-TMSI value, as illustrated in FIG. 7B, which will be described later.

FIG. 6 is a call flow diagram illustrating a call start and end procedure that is performed between an RNC and an SGSN in a WCDMA network. As shown in FIG. 6, the RNC 130 sends a Connection Request (CR) message to the SGSN 140 at step S10, at which SLR data is sent together with the CR message. Thereafter, the SGSN 140, having received the request, performs a related call connection process, and then sends a Connection Confirm (CC) message to the RNC 130 at step S12, at which SLR and DLR data is sent along with the CC message.

After the call is set up, a Data Form 1 message sends a higher layer message between the RNC 130 and the SGSN at step S14, at which SLR and DLR data is sent along with the higher layer message. In this state, the SGSN 140 sends a call connection release message RLSD to the RNC 130 at step S16, and the RNC 130 releases the call connection and sends a Release Complete message RLC to the SGSN 140 at step S18, thereby terminating the call.

Meanwhile, the SGSN data extraction device 320 captures a Create PDP Context Request message in the Gn link by performing step S120, and determines whether the message is a message related to a MIN to be acquired by determining whether an MSIDN included in the message is a MIN to be acquired at step S122. If, as a result of the determination at step S122, the message is determined to be a MIN to be acquired, an IMSI is extracted from the Create PDP Context request message by performing step S124, and whether a Create PDP Context Response message, which is a response to the create PDP context message, has been received is determined at step S126. If, as a result of the determination at step S126, the Create PDP Context Response message is determined to have been received, the process proceeds to step S128, and then the message is searched for a mobile IP address assigned to a corresponding mobile station.

Thereafter, at step S130, SLR/DLR-based data, stored at step S104, is searched for an Activate PDP Context Accept message based on the IMSI and the mobile IP address information previously extracted with respect to the mobile station, and at step S132, the mobile IP address of the mobile station, included in the found message, is identical to the mobile IP address of the MIN previously found at step S122. If, as a result of the determination at step S132, the two mobile IP addresses are determined to be identical to each other, the process proceeds to step S134, and then the SLR or DLR data of the SCCP, included in the Activate PDP Context Accept message, is searched for and then registered. Thereafter, at step S136, data is extracted from storage using the found SLR/DLR data, a P-TMSI included in the message is extracted by searching the extracted data for a Service Request or a CR-Attach Request, and the P-TMSI is stored in association with the SLR/DLR data. In this process, if the P-TMSI does not exist, an IMSI is extracted and is stored in association with the SLR/DLR. Furthermore, in order to capture data using the SLR/DLR data of the MIN afterward, the corresponding data is delivered to a previously prepared capture logic.

Meanwhile, if, as a result of the determination at step S102, the registered SLR/DLR is determined to exist, all Iu-PS transmitted and received data having the SLR/DLR is captured at step S140. Thereafter, at step S142, whether a SCCP RLC Release Complete message related to a MIN to be acquired has been received is determined. If the message has been received, the termination of a call has been made, so that the process proceeds to step S144, and then initialization is performed by deleting the SLR/DLR data from SCCP data storage, and, thereafter, the program is terminated. In contrast, if, as a result of the determination at step S142, the SCCP RLC message has not been received, the program returns to step S100.

FIG. 7A shows a message type illustrating the fact that, in the case where no P-TMSI exists in a CR-Attach Request, transmitted and received data can be extracted in an Iu-PS link, and FIG. 7B shows a message type illustrating the fact that a packet, which is not captured using the SLR/DLR data of the SCCP, can be captured using an IMSI or a P-TMSI included in the Id-Paging of an RANAP.

The method of collecting data using a MIN in a WCDMA network according to the present invention is not limited to the above-described embodiment, but may be varied and then worked without departing from the scope of the technical spirit of the present invention. For example, although, in the above-described embodiment, SLR/DLR data is used, only SLR data is required in the case where a mobile station, for which data is acquired, corresponds to a source, while only DLR data is required in the case where the mobile station corresponds to a destination.

According to the method of collecting data using a MIN in a WCDMA network according to the present invention, transmitted and received data can be collected using a MIN in the Iu-PS link of an SGSN system in a WCDMA network with the aid of simple general-purpose equipment, so that user service and network management can be easily performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of collecting data using a Mobile Identification Number (MIN) in a Wideband Code Division Multiple Access (WCDMA) network, in which transmitted and received data related to a mobile station is collected in an Iu-PS interface link in the WCDMA network, in which an SGSN and an RNC are connected to each other via the Iu-PS interface link and the SGSN and a GGSN are connected to each other via an Gn interface link, the method comprising the steps of:
   (a) reassembling ATM/AAL5 data into SCCP and higher layer data in the Iu-PS interface link, and capturing the reassembled data;
   (b) extracting SLR or DLR data from Connection Request (CR) or Connection Confirm (CC) of the captured SCCP data, and storing reference Radio Access Network Application Part (RANAP) message data having the higher layer data in storage based on the extracted SLR or DLR data;
   (c) extracting a mobile IP address related to a MIN of the mobile station in the Gn interface link; and
   (d) registering SLR or DLR data having the mobile IP address, and, afterward, capturing and extracting transmitted and received data having the SLR or DLR data in the Iu-PS interface link.

2. The method as set forth in claim 1, wherein step (c) comprises the steps of:
   (c1) capturing a Create PDP Context Request message in the Gn interface link;
   (c2) if MSISDN included in the captured Create PDP Context Request message is a MIN to be acquired, extracting an IMSI from the Create PDP Context Request message; and
   (c3) if a Create PDP Context Response message, that is, a response to the Create PDP Context Request message, has been received, searching the received Create PDP Context Response message for the mobile IP address assigned to the mobile station.

3. The method as set forth in claim 2, wherein the registration of the SLR or DLR data at step (d) comprises the steps of:
   (d1) searching the SLR or DLR-based data, stored at step (b), for an Activate PDP Context Accept message using the mobile IP address found at step (c3);
   (d2) determining whether a mobile IP address of the mobile station contained in the found Activate PDP Context Accept message is identical to the mobile IP address of the MIN found at step (c3); and
   (d3) if the two mobile IP addresses are identical to each other, searching the Activate PDP Context Accept message for SLR or DLR data of the SCCP data and registering the SLR or DLR data.

4. The method as set forth in claim 3, further comprising the steps of:
   extracting the data, stored at step (b), using the SLR or DLR data registered at the step (d);
   searching the data, extracted at the previous step, for a Service Request or a CR-Attach Request, extracting a P-TMSI or an IMSI from the message, and storing the P-TMSI or IMSI in association with the SLR or DLR data; and
   extracting data having the stored P-TMSI or IMSI from the transmitted and received data, captured at step (d), in the Iu-PS interface link.

5. The method as set forth in claim 4, wherein the data using the P-TMSI or IMSI is an Id-Paging packet of the RANAP message data.

* * * * *